United States Patent [19]
Groleau et al.

[11] 3,982,440
[45] Sept. 28, 1976

[54] METHOD OF DETERMINING MOLDED PART PROFILE

[75] Inventors: Rodney J. Groleau, Plantsville; Donald C. Paulson, Southington, both of Conn.

[73] Assignee: Control Process, Incorporated, Plantsville, Conn.

[22] Filed: Aug. 13, 1975

[21] Appl. No.: 604,248

[52] U.S. Cl. .......................... 73/432 R; 235/151.1; 264/40.1
[51] Int. Cl.² ......................................... B29F 1/06
[58] Field of Search ................... 73/389, 432 R, 54; 425/149; 264/40; 235/151.1

[56] References Cited
UNITED STATES PATENTS

| | | | |
|---|---|---|---|
| 3,792,134 | 2/1974 | Paulson | 264/40 |
| 3,840,312 | 10/1974 | Paulson et al. | 425/149 |
| 3,860,801 | 1/1975 | Hunkar | 235/151.1 |
| 3,893,792 | 7/1975 | Laczko | 425/149 |

*Primary Examiner*—Charles A. Ruehl

[57] ABSTRACT

A method is provided for determining the profile of a molded part as a means of checking the quality of a given molded part and/or as a basis for effecting adjustments in the molding machine controls. In accord with the subject method a plurality of pressure sensings are taken simultaneously at different locations in the molding machine. These sensings are employed in accord with a known mathematical formula for establishing a profile of the part being molded wherefrom it is possible to determine the physical characteristics which the molded part will have. For purposes of establishing the profile of the part, the values of the pressure sensings in pounds per square inch are plotted against the distance from the gate at which the pressure is measured, the latter distance being indicated in suitable units of length. The method for determining the profile of a molded part is also operable for purposes of determining whether any material flow has occurred at a given location in the molding machine. The method of the present invention may be practiced either with molding machines which embody a single mold cavity or with those that embody multiple mold cavities.

10 Claims, 11 Drawing Figures

METHOD OF DETERMINING MOLDED PART PROFILE

BACKGROUND OF THE INVENTION

It has long been known that variations in the pressure of the material being molded in the cavity of a molding machine or cast in the cavity of a die cast machine is the most frequent cause of flash being formed in the parts being produced, short shots of material being fed to the cavity, and inconsistencies in the properties of the parts produced. With particular reference to the operation of molding machines, pressure variations occur because of changes in the viscosity of the material, i.e., plastic being molded. Such changes are commonly found to be due to either temperature variations or molecular weight. Pressure variations also occur as a result of variations in machine performance due to such things as timer errors, air temperature, hydraulic response, etc. In addition, pressure variations are attributable to operator errors wherein wrong timers, settings, etc., are employed by the operator.

Most rejects, it has been found, are caused by occurrences coming during the filling portion, i.e., when material is being fed to the cavity, and during the packing portion, i.e., when the material is solidifying in the cavity, of the molding cycle. It is this part of the cycle, i.e., the filling and packing portions thereof when orientation is developed, molecular packing is induced, and peak pressures are determined. Any errors or inconsistencies in the dynamics of filling and packing result in variations in the parts produced.

As the cavity fills with material, the pressure therein will rise slowly until packing of the material begins to occur, whereupon the pressure will rise rapidly. This may be referred to as the dynamic portion of the cycle of operation of the machine. If the pressure in the cavity rises too slowly or is stopped too soon, then short shots will occur because the material is afforded an opportunity to solidify before the cavity is entirely filled, or in the case of the mold having plural cavities, before all of the cavities are filled with material. If the pressure rises too rapidly or occurs too long, then flash is likely to form on the part being produced due to overpacking.

The likelihood that pressure variations will occur causing the undesirable results described above is particularly likely where thin-walled parts, i.e., lids, containers, housings, etc. are being produced inasmuch as the production of the latter requires that the cavity be filled quickly but not be overpacked. These two requirements however are often in conflict. As a result, short shots caused by insufficient pressure, flashed parts caused by excessive pressure, and warped parts caused by overpacking or underpacking are common.

In order to eliminate the existence of undesirable pressure variations in the mold cavity, a number of different types of control systems have been proposed for inclusion in molding machines as a means of effectuating control over the latter thereby to enable the amount of pressure in the cavity of the machine to be regulated. Because of the difficulty in controlling pressure, however, one approach which has been employed in the prior art for instance is the so-called volume-feeding technique wherein a limit switch or other equivalent control device is utilized to control the amount of material fed each cycle. Moreover, the screw by means of which the material is fed into the mold is caused to move through a predetermined distance. This method works as long as the limit switch is accurate and the nonreturn valve operatively associated with the screw does not leak. However, these two conditions rarely exist for long.

Another approach, similar to the aforereferenced volume-feeding technique, which has also been utilized heretofore is the technique of weight-feeding wherein the theoretical weight of the material needed to fill the mold completely is determined and this amount of material is caused to be fed to the mold once each cycle. Although the weight-feeding technique has been found to produce more accurate results than the volume-feeding technique, it also nevertheless suffers from a disadvantage. Namely, even a small deviation in the weight of the material fed to the mold can produce wide variations in cavity pressure.

Still another technique, which previously has sometimes been employed, involves sensing the forward velocity of the screw which is operative to cause material to be fed to the mold. The difficulty with this approach however is that a change in the forward velocity of the screw may not necessarily arise from the fact that the mold cavity has become filled with material. Rather this change may be attributable to the existence of other factors affecting the flow of the material intermediate the point at which the material leaves engagement with the screw and the point at which the material enters the mold cavity. More particularly, since cavity pressure is not being determined from readings taken directly within the cavity, but instead is based on readings obtained at a point remote therefrom, other factors such as a blockage in the path of flow of the material, etc. may actually be the cause for a change occurring in the forward velocity of the screw rather than the fact that the cavity has filled with material. Thus, utilizing this technique there exists opportunities for inaccurately portraying the actual condition of the cavity pressure.

Other techniques have been employed heretofore in the prior art, however, these other techniques have also suffered from one or more disadvantages. There has thus existed a need to provide a method, which does not suffer from the disadvantages which characterize prior art methods of controlling cavity pressure, but which would be operable for purposes of determining the profile of a molded part as a means of checking the quality of a given molded part and/or as a basis for effecting adjustments in the molding machine controls. In accord with the present invention, such a method has been provided. The latter method involves the simultaneous taking of a plurality of pressure sensings in a molding machine, and the employment of these pressure sensings in accord with a known mathematical formula to establish a profile of the part being molded wherefrom it is possible to determine the physical characteristics that the molded part will possess. In establishing the profile of the molded part, the values of the pressure sensed in pounds per square inch are plotted against the distance measured from the gate of the molded cavity to the location whereat the pressure sensings were obtained, and with the distance being indicated in units of length.

There are a number of ways in which the method may be practiced. Namely, in accord with one form thereof, the profile of a part being molded in a molding machine having a single mold cavity may be determined by simultaneously taking a pressure sensing in the hot runner of the mold and a pressure sensing at a location in the mold cavity. Also, the profile of a part being molded in a molding machine having a single mold cavity may be determined by obtaining pressure sensings simultaneously from two locations suitably spaced apart in the mold cavity. In addition, the method of the present invention may be employed with molding machines embodying multiple mold cavities to obtain a comparison between the profile of a part being molded in one mold cavity with that being molded in a different mold cavity of the same molding machine based on pressure sensings obtained simultaneously in the corresponding hot runner for each mold cavity. Moreover, the method of the present invention additionally is capable of being practiced to effect a comparison of the profile of parts being molded in multiple cavities of the same molding machine by obtaining pressure sensings simultaneously at differently spaced locations in each of the corresponding mold cavities. Yet another use to which the method of the present invention may be put is for determining whether any material flow has occurred at a given location either in a molding machine embodying a single mold cavity or in a molding machine embodying multiple mold cavities.

Accordingly, it is an object of the present invention to provide a novel and improved method for determining the profile of a molded part as a means of checking the quality of a given molded part.

It is also an object of the present invention to provide such a method for determining the profile of a molded part as a means of establishing whether a need exists to effect adjustments in the molding machine controls.

It is another object of the present invention to provide such a method for determining the profile of a molded part being molded in a molding machine having a single mold cavity by simultaneously taking a pressure sensing in the hot runner of the mold and a pressure sensing at a location in the mold cavity.

A further object of the present invention is to provide such a method for determining the profile of a molded part being molded in a molding machine having a single mold cavity by simultaneously obtaining pressure sensings from at least two locations suitably spaced apart in the mold cavity.

A still further object of the present invention is to provide such a method for determining the profile of molded parts being molded in a molding machine having multiple mold cavities by comparing the profile of a part being molded in one cavity with that being molded in a different mold cavity of the same molding machine based on pressure sensings obtained simultaneously in the corresponding hot runner for each mold cavity.

Yet another object of the present invention is to provide such a method for determining the profile of molded parts being molded in a molding machine having multiple mold cavities by obtaining pressure sensings simultaneously at differently spaced locations in each of the corresponding mold cavities.

Yet still another object of the present invention is to provide such a method for determining the profile of a molded part which is also operable for purposes of determining whether any material flow has occurred at a given location either in a molding machine embodying a single mold cavity or in a molding machine embodying multiple mold cavities.

SUMMARY OF THE INVENTION

It has now been found that the foregoing and related objects can be readily attained in a method for determining the profile of a molded part as a means of checking the quality of a given molded part and/or as a basis for effecting adjustments in the molding machine controls. In accord with the subject method, a plurality of pressure sensings are taken simultaneously at different locations in the molding machine. These sensings are employed in accord with a known mathematical formula for establishing a profile of the part being molded from which it is possible to determine the physical characteristics which the molded part will have. For purposes of establishing the profile of the part, the values of the pressure sensings in pounds per square inch are plotted against the distance from the gate at which the pressure is measured, the distance being indicated in suitable units of length. The method of the present invention may be practiced either with molding machines which embody a single mold cavity or with those that embody multiple mold cavities. Moreover, in accord with the present invention, a method is provided which may be employed for determining whether material flow has occurred at a given location in either the case of a molding machine embodying a single mold cavity, or in the case of a molding machine embodying multiple mold cavities.

In accord with one embodiment of the invention, namely, in practicing the method of the present invention with molding machines having single mold cavities in accord with one form thereof the profile of the part is determined by simultaneously taking a pressure sensing in the hot runner and a pressure sensing in the mold cavity. In accord with another form thereof, the profile of the molded part is determined by taking pressure sensings simultaneously at spaced locations within the mold cavity.

In accord with another embodiment of the invention, namely, when the method is practiced with molding machines embodying multiple mold cavities, in accord with one form thereof a comparison is made between the profile of a part being molded in one mold cavity with that being molded in a different mold cavity of the same molding machine based on pressure sensings obtained simultaneously in the corresponding hot runner for each mold cavity. In accord with another form thereof, a comparison is made of the profile of parts being molded in multiple cavities of the same molding machine by obtaining pressure sensings simultaneously at locations which are different relative to the length of the respective mold cavity in each of the corresponding mold cavities.

DETAILED DESCRIPTION OF THE ILLUSTRATED EMBODIMENTS

Figure 1:
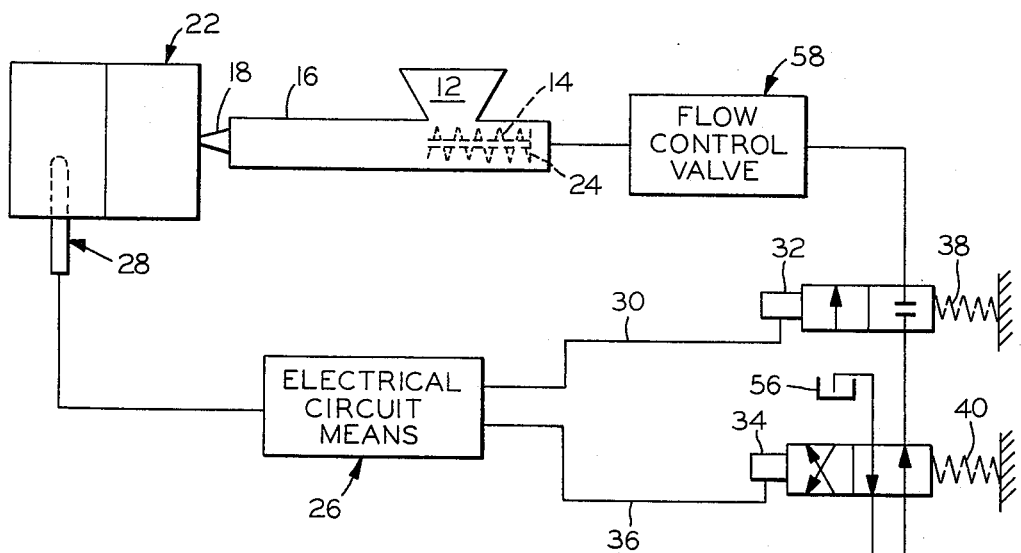
FIG. 1 is a block diagram of the major components of an injection molding machine with which the method in accord with the present invention can be practiced.

Referring now to the drawings and more particularly FIG. 1 thereof, there is illustrated therein the major components of an injection molding machine, generally designated by reference numeral 10, with which the method of the present invention can be practiced. As will be best understood with reference thereto, material of the type suitably adapted for molding purposes is supplied from a suitable source (not shown) to the feed hopper 12. In accord with conventional practice, the molding material supplied to the hopper 12 is fed therefrom into the space which exists between the screw 14 and the inner wall of the cylindrical housing 16 in which the screw 14 is suitably mounted for rotational movement. As the screw 14 rotates, the material which has been fed into the interior of the housing 16 is kneaded and plasticized by the action of the screw 14. Moreover, the rotational movement of the screw 14 is utilized for purposes of causing the material to flow therefrom and into the nozzle 18. The material is injected from the nozzle 18 into the cavity 20 of the mold 22. More specifically, the path of flow of the material is from the nozzle 18 through the sprue (not shown) and gate (not shown) to the cavity.

The screw 14 is connected at its right hand end as viewed with reference to FIG. 1 of the drawings, to a hydraulically operated injection cylinder 24. In a manner yet to be described, fluid such as hydraulic oil is pumped to the right hand end portion of the housing 16 as viewed with reference to FIG. 1 wherein the hydraulic oil functions to cause the movement of the cylinder 24 and thereby the screw 14. Moreover, as should be readily apparent, the extent of displacement of the screw 14 is one of the variables which determines the shot size, i.e., the amount of material which is injected into the mold 22 from the nozzle 18 and thus ultimately the amount of material which reaches the cavity 20.

Figure 11:
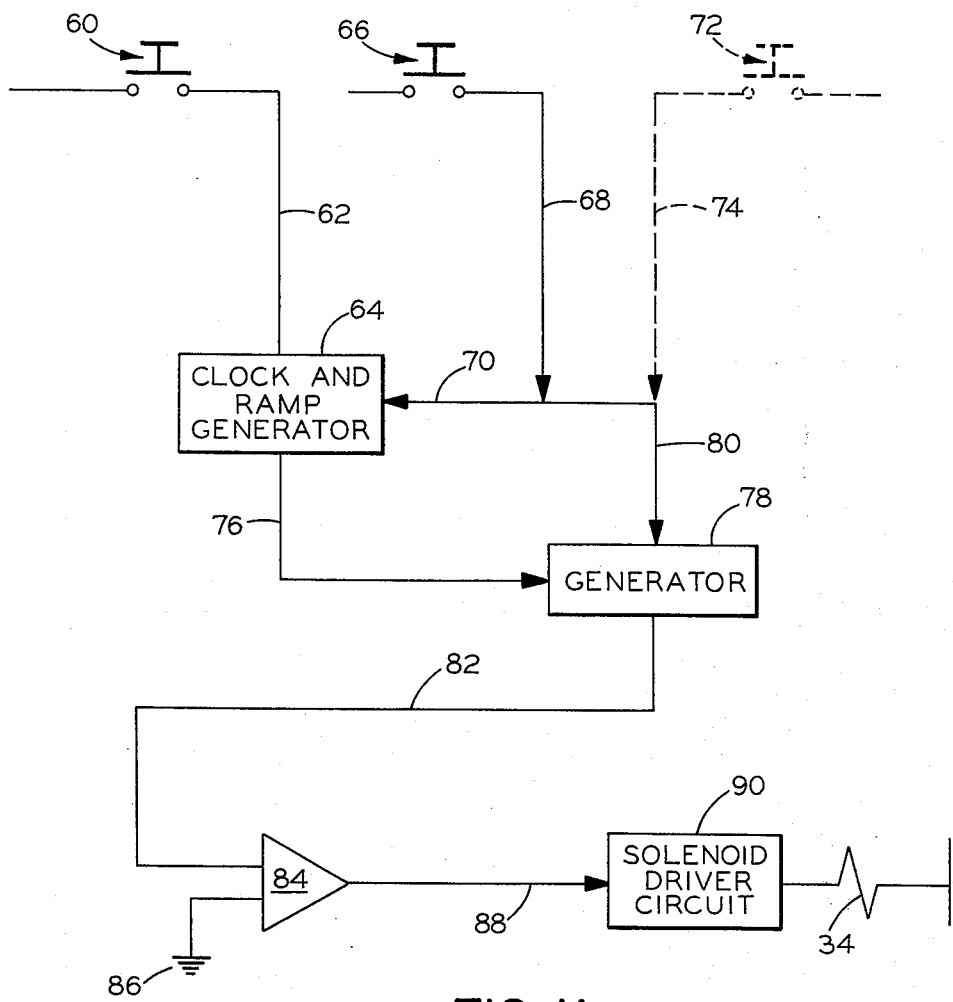
FIG. 11 is a schematic electrical diagram of the circuitry with which the injection molding machine of FIG. 1 may be provided in accord with the present invention for purposes of practicing the method of the present invention.

In order to eliminate variations in mold cavity pressure that cause flash, short shots and part inconsistencies to occur which necessitate parts being rejected, the injection molding machine 10 as shown in FIG. 1 of the drawings is provided in accordance with the present invention with electrical circuit means operable to enable the method for determining the profile of a molded part to be practiced. The latter method is employed as a means for checking the quality of a given molded part, i.e., to determine whether the part needs to be rejected, and/or as a basis for effecting adjustments in the molding machine controls. The aforesaid electrical circuit means capable of accomplishing the latter function is depicted in FIG. 11 of the drawings and will be described hereinafter. Moreover, a schematic representation of the electrical circuit means depicted in FIG. 11 is provided in block diagram form in FIG. 1 of the drawings in the block bearing the legend "ELECTRICAL CIRCUIT MEANS" and which has the reference numeral 26 applied thereto. The aforereferenced electrical circuit means 26 is capable of being employed for purposes of effecting control over the operation of the molding machine 10. Accordingly, as shown in FIG. 1 of the drawings, the electrical circuit means 26 is connected in electrical circuit relation with a pressure sensing means 28. In a manner yet to be described, the pressure sensing means 28 is located in the molding machine 10 so as to be operable for purposes of sensing the pressure of the material being supplied to the mold 22, which sensings in turn are utilized for purposes of determining the profile of the part being molded. In this connection, the pressure sensing means 28 as will be described more fully subsequently preferably includes a plurality of individual pressure sensors. Each of the latter pressure sensors may embody either a pressure transducer operable for purposes of producing an analog output or more preferably a pressure switch which produces a digital output.

Continuing with a description of the other major components which are depicted in FIG. 1 of the drawings as being operatively associated with the molding machine 10 and the electrical circuit means 26, there will now be set forth a description of the pump means which is operable to provide the hydraulic oil to the injection cylinder 24 where the oil is utilized for purposes of causing movement of the cylinder 24. As shown in FIG. 1, the electrical circuit means 26 is connected in electrical circuit relation by means of conductor 30 to the solenoid 32. Moreover, the electrical circuit means is similarly connected in electrical circuit relation to the solenoid 34 by means of conductor 36. The manner in which control is effected over the solenoids 32 and 34 through the electrical circuit means 26 will be described more fully hereinafter. At this point, it is merely sufficient to note that the operation of the solenoids 32 and 34 is controlled through the electrical circuit means 26.

As shown in FIG. 1 of the drawings, the solenoid 32 which comprises a part of the solenoid operated valve 38 is the injection forward solenoid which allows hydraulic oil to flow to the injection cylinder 24. The solenoid 34 which comprises a part of the solenoid operated valve 40 is the booster solenoid which allows the high pressure or high volume pump 42 to supply hydraulic oil to the injection cylinder 24. As will be described more fully hereinafter, when a predetermined condition is sensed to exist in the molding machine 10, the electrical circuit to the booster solenoid 34 is opened. This in turn is effective to deenergize the booster solenoid 34 and switch the booster pump 42 out of the hydraulic circuit thereby allowing the holding pump 44 to supply hydraulic oil to the injection cylinder 24. In addition, when a second predetermined condition is sensed to occur in the molding machine 10, the injection forward cylinder 32 becomes energized which stops the flow of all hydraulic oil to the injection cylinder 34.

Referring further to FIG. 1 of the drawings, the pumps 42 and 44 are operatively connected to the motor 46 in conventional fashon such as to be capable of being driven thereby. Furthermore, preferably regulating valves 48 and 50 are provided in the fluid circuit between the pumps 42 and 44, respectively, and the injection cylinder 24. The regulating valve 48 is employed as a means of providing a control setting for the booster pressure, while the regulating valve 50 is employed as a means of providing a control setting for the holding pressure. Finally, suitable drain tanks 52, 54 and 56 are preferably associated with the pump 42, pump 44 and solenoid operated valve 38, respectively.

Completing the description of the manner in which hydraulic oil is fed to the injection cylinder 24, in accord with the illustrated embodiment of the molding machine 10 a flow control valve 58 is preferably interposed between the solenoid operated valve 38 and the injection cylinder 24. Through the operation of the flow control valve 58, the flow rate for the hydraulic oil being fed to the injection cylinder 24 is set prior to the commencement of a cycle of operation of the molding machine 10. In accord with the illustrated embodiment of the molding machine 10, the flow control valve 58 comprises an electrohydraulic valve of the type commonly used on molding machines. Although adjustment of the flow control valve 58 can be effected in many different ways, preferably this is done automatically through suitable means (not shown) which are connected in electrical circuit relation therewith. Moreover, although the flow control valve 58 has been depicted as comprising the means through which the flow rate of hydraulic oil to the injection cylinder 24 is established, it is to be understood that this function could also be accomplished through the use of other means without departing from the essence of the invention, such as for instance through the use of a servomotor, adjusting the hydraulic mechanical valves 48 and 50, or if desired by hand.

Turning now to a description of the electrical circuitry depicted in FIG. 11 of the drawings, a first pressure responsive switch 60 is connected in electrical circuit relation by means of conductor 62 to a clock and ramp generator 64. The function of the pressure responsive switch 60 is to provide an input to the clock and ramp generator 64 which in turn is effective to cause the latter to initiate a timing cycle. To this end, the pressure responsive switch 60 may be located in the mold cavity 20, or at some other suitable location in the molding machine 10, or may comprise the Start button which is employed to commence a cycle of operation of the molding machine 10. There is also embodied in the electrical circuitry depicted in FIG. 11, a second pressure responsive switch, i.e., a switch 66 which like the first pressure responsive switch 60 is also connected in electrical circuit relation to the clock and ramp generator 64. More specifically, the second pressure responsive switch 66 which is connected by conductors 68 and 70 to the clock and ramp generator 64 functions as a stop input thereto. Namely, the pressure responsive switch 66 when actuated is effective to provide an input to the clock and ramp generator 64 which in turn is operable to terminate the timing cycle of the latter which had commenced when the first pressure responsive switch, i.e., switch 60 was actuated. To accomplish the aforedescribed function, the second pressure responsive switch 66 is preferably mounted within the mold cavity 20 so as to be located in the molding machine 10 downstream in the path of flow of the material therewithin relative to the location of the first pressure responsive switch 60. As depicted in dotted lines in FIGS. 11 of the drawings, one or more additional pressure responsive switches may be connected, if so desired, in electrical circuit relation with the clock and ramp generator 64. Namely, as shown in dotted lines, one or more pressure responsive switches 72 may be connected by means of conductors 74 and 70 to the clock and ramp generator 64.

Continuing with the description of the electrical circuitry shown in FIG. 11 of the drawings, there is provided an output 76 which is fed from the clock and ramp generator 64 as an input to a second generator 78. The function of the generator 78 is to provide a second time function, i.e., timing cycle. This second timing cycle commences when the timing cycle provided by the clock and ramp generator 64 terminates. More specifically, the output 76 from the clock and ramp generator 64 operates to initiate the start of the timing cycle by the second generator 78. The termination of the timing cycle being generated by the generator 78 occurs upon the receipt by the latter of a Stop signal. The latter Stop signal is provided as an input 80 to the generator 78. More specifically, the input 80 comprises an output from either the second pressure responsive switch 66, or in the case wherein the electrical circuitry embodies additional pressure responsive switches 72, from one of the latter switches.

With further regard to the nature of the electrical circuitry which is depicted in FIG. 11 of the drawings, the output 82 which is supplied from the generator 78 is fed as an input to the detector 84. The other input to the detector 84 is connected to ground 86. Finally, the output 88 from the detector 84 is transmitted to a solenoid driver circuit, schematically depicted in FIG. 11 by the block designated therein by reference numeral 90. The solenoid driver circuit 90 in turn is operatively connected to the solenoid 34 whereby the former effects control over the latter. As has been described previously hereinabove in connection with the description of FIG. 1 of the drawings, the solenoid 34 which comprises a part of the solenoid operated valve 40 is the booster solenoid which allows the high pressure or high volume pump 42 to supply hydraulic oil to the injection cylinder 24. Regarding the solenoid driver circuit 90, inasmuch as the nature of such circuits are well-known to those skilled in the art it has not been determined necessary for one to obtain an understanding of the present invention to describe more fully herein and/or illustrate more fully in the drawings the aforesaid solenoid driver circuit 90. Rather, it is deemed sufficient to note that in response to a predetermined output being provided from the detector 84 to the solenoid driver circuit 90, the latter operates to effect an opening of the electrical circuit to the booster solenoid 34. When this occurs, the booster solenoid 34 becomes deenergized and the booster pump 42 is switched out of the hydraulic circuit thereby allowing the holding pump 44 to supply hydraulic oil to the injection cylinder 24.

Figure 2:
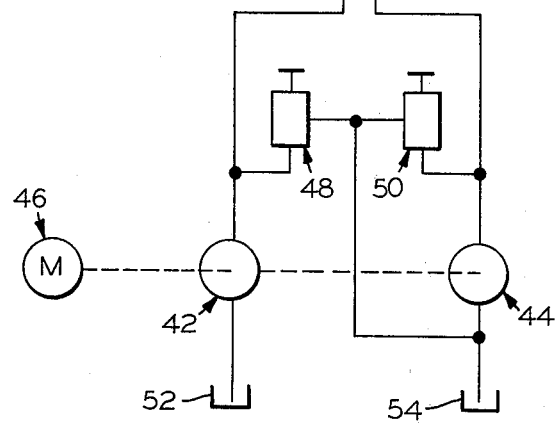
FIG. 2 is a schematic diagram of a portion of an injection molding machine embodying a single mold cavity, illustrating the positions occupied therein by the pressure sensing means for purposes of practicing the method of the present invention in accord with one form thereof.
Figure 2:
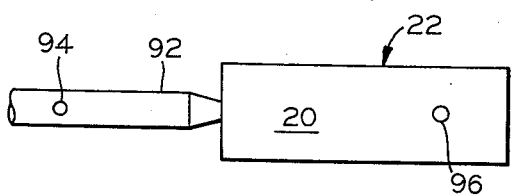

Turning now to a consideration of FIG. 2 of the drawings, there is schematically depicted therein a portion of an injection molding machine, such as for instance a portion of the injection molding machine 19 which is found illustrated in FIG. 1. More specifically, the portion of the injection molding machine shown schematically in FIG. 2 of the drawings consists of the hot runner 92 and the mold 22. The latter in accord with the form of the invention illustrated in FIG. 2 embodies a single cavity 20. Moreover, as shown in FIG. 2, the pressure sensing means 28 takes the form of a pair of pressure responsive switches 94 and 96, which are suitably supported so as to lie in the path of flow of the material being fed to the cavity 20. Namely, the pressure responsive switch 94 is mounted within the hot runner 92 so as to be actuated by the material flowing therethrough when the force being applied thereby, when correlated to a value of pressure, equals the level of the pressure setting on the pressure responsive switch 94. In a like manner, the pressure responsive switch 96 is suitably mounted in the mold cavity 20 so as to be actuated by the material flowing in the latter when the force being applied thereby, when correlated to a value of pressure, equals the pressure level setting on the pressure responsive switch 96.

There will now be set forth a description of the manner in which the pressure responsive switches 94 and 96 are employed for purposes of determining the profile of a part being molded in the cavity 20 in accord with one form of the method of the present invention. According to Poiselle's equation, the flow rate for rectangular flow channels can be determined by solving the following equation:

$$Q = \frac{Wh^3 \Delta P}{12ul} \quad (1)$$

Where:
$Q$ = flow rate
$W$ = the width of the flow channel
$h$ = the height of the flow channel
$\Delta P$ = pressure drop during flow
$u$ = viscosity
$l$ = the length of the flow channel In addition, the viscosity is capable of being mathematically defined by the following formula:

$$u = K \Delta P t \quad 2.$$

Where:
$u$ = viscosity
$K$ = a constant for a given flow channel configuration
$\Delta P$ = the pressure drop during flow as measured between a $P_1$ location and a $P_2$ location
$t$ = the flow time for flow between $P_1$ and $P_2$ locations
Moreover, using the same symbols as in equation (2), the formula for viscosity may be rewritten as follows:

$$\frac{u}{K} = (P_1 - P_2)t \quad (3)$$

Consequently, as applied to the pressure sensing system depicted in FIG. 2 of the drawings, the pressure responsive switch 94 is utilized for purposes of obtaining a sensing of the pressure $P_1$ while the pressure responsive switch 96 is employed for purposes of obtaining a sensing of the pressure $P_2$. Namely, the pressure responsive switches 94 and 96 sense the pressures $P_1$ and $P_2$ in the flow stream of the material in the injection molding machine. More specifically, when the pressure $P_1$ reaches the level of the pressure set on the pressure responsive switch 94, the latter is actuated. Actuation of the switch 94 in turn causes a clock to begin running. Then, when the pressure $P_2$ reaches the level of the pressure set on the pressure responsive switch 96, the latter is actuated. Actuation of the switch 96 in turn is effective to stop the aforereferenced clock. As applied for example to the electrical circuit illustrated in FIG. 11 of the drawings, the pressure responsive switch 94 could correspond to the pressure responsive switch 60, the clock to the clock portion of the clock and ramp generator 64 and the pressure responsive switch 96 to the pressure responsive switch 66. Proceeding again with the description of the mode of operation of the pressure sensing system of FIG. 2, when the clock is stopped the pressures at the $P_1$ and $P_2$ locations are sampled. Based on the information obtained from this sampling, i.e., the values of the pressures at the $P_1$ and $P_2$ locations as well as the flow time $t$ obtained from the clock, equation (3) is solved. Although this may be done manually, preferably the mathematics of equation (3) is performed electronically, through the use of conventional electrical components which are well-known to those skilled in the art. By solving equation (3), a relative viscosity is obtained, and the latter can be read out as a number on a meter (not shown). On the other hand, if a measure of true viscosity is desired, K can be determined for the flow channel and manually inserted into the electronic circuitry, whereby the results produced by electronically solving equation (3) will produce a value corresponding to the true viscosity. Based on the results of solving equation (3), it is possible to determine whether the part being molded in the mold cavity 20 will have the desired characteristics. The latter determination is made by comparing the result obtained from equation (3) with the theoretical value which should be received therefrom in order to produce molded parts having the desired quality.

Figure 3:
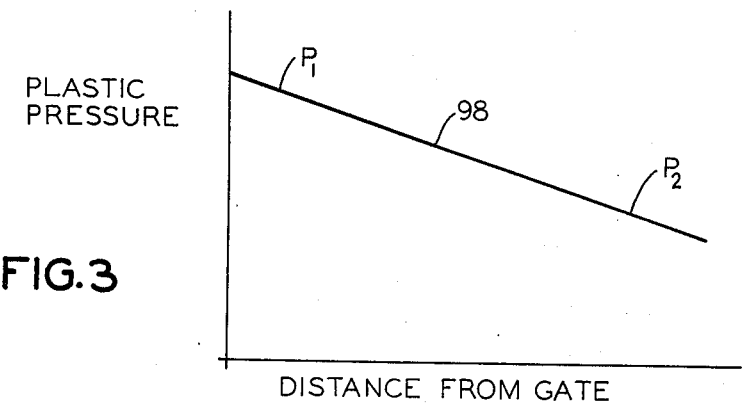
FIG. 3 is a graph of the profile of a part being molded in the mold cavity of FIG. 2 as determined by practicing the method of the present invention in accord with one form thereof.

The information which is obtained from taking the aforedescribed sampling of the pressures $P_1$ and $P_2$ when the clock is terminated may also be utilized for another purpose. Namely, as shown in FIG. 3 of the drawings, by plotting the values of the pressures for $P_1$ and $P_2$ obtained simultaneously from the sampling against the location at which the pressure sensings are obtained as measured from a predetermined reference point, and thereafter interconnecting the plotted points, a comparison can be made between the line, identified in FIG. 3 by the reference numeral 98, produced from the above and the theoretical line which should be produced in order to provide molded parts having the desired quality. More specifically, the aforedescribed graph provides a graphical representation of the pressure profile in the part being molded in the mold cavity 20. The line 98 produced by plotting the pressure values for $P_1$ and $P_2$ obtained from the sampling should conform to the aforementioned line (not shown) corresponding to the theoretical pressure profile in a part having the desired characteristics, in order to ensure that pressures at all points in the cavity 20 are such as to ensure the production during any given cycle of operation of the molding machine, i.e., shot of parts of good quality. If the two lines do not conform indicating that one or both of the pressures $P_1$ and $P_2$ or all of the pressures therebetween within the mold cavity 20 are not within tolerance, the part is rejected. The manner in which the part is caused to be rejected can vary. Namely, the molding machine 10 may be equipped with suitable indicator means (not shown) whereby an indication is provided automatically when the part being molded based on the profile thereof is sensed not to possess the desired quality, or the latter indication may be produced through the employment of some form of manually operable indicator means.

Figure 4:
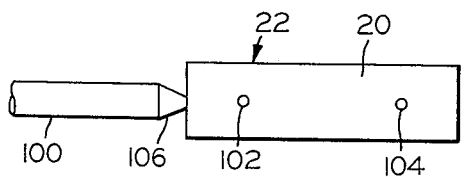
FIG. 4 is a schematic diagram of a portion of an injection molding machine embodying a single mold cavity, illustrating the position occupied therein by the pressure sensing means for purposes of practicing the method of the present invention in accord with another form thereof.

With reference next to FIG. 4 of the drawings, there is depicted therein a portion of an injection molding machine which for instance may be considered to comprise a portion of the injection molding machine 10 of FIG. 1. More specifically, as in the case of FIG. 2 which has been described previously hereinabove, the portion of the injection molding machine depicted in FIG. 4 of the drawings comprises the hot runner 100 and the mold cavity 22. The latter in accord with the form of the invention depicted in FIG. 4 of the drawings embodies a single cavity 20. Moreover, as shown in FIG. 2 the pressure sensing means 28 takes the form of a pair of pressure responsive switches 102 to 104, which are suitably located so as to lie in the path of flow of the material being fed to the cavity 20. Namely, the pressure responsive switch 102 is mounted within the mold cavity 20 adjacent to the gate 106 which serves to interconnect the hot runner 100 with the cavity 20 in the mold 22. The pressure responsive switch 102 is suitably located so as to be actuated by the material entering the cavity 20 of the mold 22, when the force being exerted by the material when correlated to a value of pressure equals the pressure level which is set on the pressure responsive switch 102. Insofar as concerns the pressure responsive switch 104, the latter is suitably mounted within the mold cavity 20 so as to be located therein downstream from the pressure responsive switch 102 in the path of flow of the material being fed into the cavity 20 of the mold 22. Therefore, the force being exerted by the material flowing in the mold cavity 20 when correlated to a value of pressure is effective to cause actuation of the pressure responsive switch 104 when the value thereof reaches the level of the pressure which is set on the pressure responsive switch 104.

The pressure responsive switches 102 and 104 are intended to be employed in essentially the same manner as the pressure responsive switches 94 and 96 depicted in FIG. 2 of the drawings which have been described hereinabove previously. More specifically, the pressure responsive switches 102 and 104 are suitably connected in electrical circuit relation with a suitable clock whereby when the pressure responsive switch 102 is actuated, the latter action is effective to start the clock running. The clock continues to run until a second pressure responsive switch, i.e., the switch 104 is actuated. When the latter event occurs, a signal is sent from the pressure responsive switch 104 to the clock which is effective to terminate the running of the latter. Then a sampling is taken simultaneously of the pressure levels existing in the mold cavity 20 at the locations whereat the pressure responsive switches 102 and 104 are located. Thereafter, employing the information obtained from this sampling, i.e., the values of the pressures $P_1$ and $P_2$ as well as the flow time t obtained from the clock, equation (3) is solved. This is preferably done electronically, although it also may be done manually. Upon solving equation (3), a value is obtained for the relative viscosity of the material flowing within the mold cavity 20. Inasmuch as it is possible to predetermine what the relative viscosity of the material should be in order to produce molded parts having the desired qualities, it is also possible by comparing the value for the relative viscosity obtained by solving equation (3) with the known value therefor to determine whether the part being molded in the cavity 20 of the mold 22 will be of the proper quality, or whether this part must be rejected.

Figure 5:
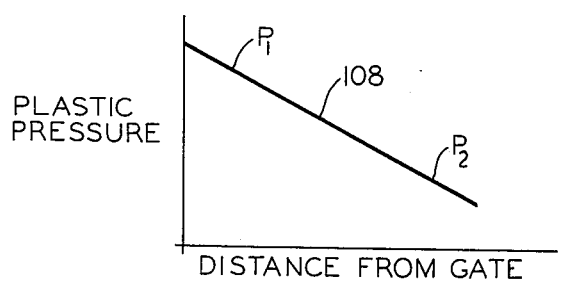
FIG. 5 is a graph of the profile of a part being molded in the mold cavity of FIG. 4 as determined by practicing the method of the present invention in accord with one form thereof.

Similarly, by plotting the values for the pressures existing in the mold cavity 20 as obtained during the aforedescribed sampling against the location whereat the pressures are sensed, as measured against the distance therefrom to the gate 106, a graphical representation is produced of the profile of the part being molded in the mold cavity 20. More specifically, the ordinate of the graph is plotted in terms of cavity pressure while the abscissa of the graph represents the distance by which the pressure sensors are spaced from the gate 106. By comparing the graphical plot, i.e., the line identified by reference numeral 108 for the profile of the molded part when produced in the aforedescribed manner, and as depicted in FIG. 5 of the drawings, with the theoretical profile which a part of the desired quality should have and which can be predetermined, a determination can be made as to whether the part now being produced in the mold cavity 20 will be of the proper quality, or whether it should be rejected. In summary, in accord with the system which is found depicted in FIG. 4 of the drawings, two cavity pressures are sensed in the mold 22 during the molding cycle. Sensing of two or possibly more cavity pressures simultaneously in the cavity 20 determines a pressure profile in the part being molded which ensures, that if repeated, pressures at all points in the cavity 20 are duplicated from one shot to the next. Moreover, if based on the graphical plot of the profile in the molded part, it is determined that both or all pressures are not within tolerance, the part is rejected.

Figure 6:
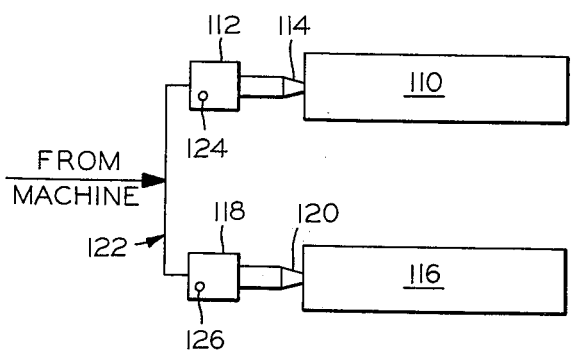
FIG. 6 is a schematic diagram of a portion of an injection molding machine embodying multiple mold cavities, illustrating the position occupied therein by the pressure sensing means for purposes of practicing the method of the present invention in accord with a third form thereof.

Referring now to FIG. 6 of the drawings, there is illustrated therein schematically in the manner of previously described FIGS. 2 and 4, a portion of an injection molding machine such as for instance a portion of the injection molding machine 10 which is shown in FIG. 1 of the drawings. More specifically, in FIG. 6 of the drawings, there is depicted a portion of an injection molding machine of the type which embodies multiple mold cavities. Namely, in FIG. 6 there is shown a first mold cavity 110 which has cooperatively associated therewith a hot runner 112, a gate 114 which functions to interconnect the first mold cavity 110 with the hot runner 112, a second mold cavity 116, a second hot runner 118 which is operatively associated with the second mold cavity 116, and a gate 120 which interconnects the hot runner 118 with the second mold cavity 116. Moreover, the hot runners 112 and 118 are suitably connected in fluid flow relation by means of channel means 122 whereby material flowing within the molding machine is caused to flow simultaneously to the hot runners 112 and 118 and therefrom into the mold cavities 110 and 116, respectively. Each of the hot runners 112 and 118 is suitably provided with a pressure sensor 124 and 126, respectively. More specifically, the pressure sensors 124 and 126 are suitably positioned within the hot runners 112 and 118, respectively, so as to be located in the path of flow of material being fed to the mold cavities 110 and 116. Moreover, although not shown in FIG. 6 of the drawings in order to maintain clarity of illustration therein, it is to be understood the the pressure sensors 124 and 126 are each connected in electrical circuit relation with suitable indicator means such as a meter whereby a visual display is provided of the pressures which are sensed by the pressure sensors 124 and 126.

Figure 7:
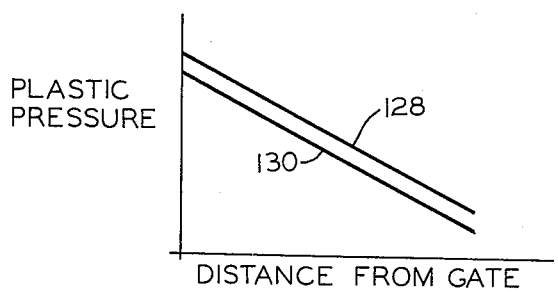
FIG. 7 is a graph of the profile of parts being molded in the mold cavities of FIG. 6 as determined by practicing the method of the present invention in accord with one form thereof.

Utilizing the pressure sensors 124 and 126, and more specifically the sensings obtained through the use thereof, a graph can be produced therefrom of the type which is found depicted in FIG. 7 of the drawings. Referring to FIG. 7 of the drawings, there is shown a graph wherein the ordinate thereof is in terms of pressures in pounds per square inch, and the abscissa thereof is in terms of distance, and more particularly the distance measured in suitable units of length by which the locations whereat pressure sensings are obtained are spaced from a predetermined reference point. With reference to FIG. 7 of the drawings, the graph depicted therein includes a plot of two lines which are identified therein through the use of the reference numerals 128 and 130. The line 128 comprises a plot of the pressure profile in the part being molded in mold cavity 110 while the line 130 comprises a plot of the pressure profile in the part being molded in mold cavity 116. These lines may be generated by extrapolating from one or more pressures obtained such as through the use of the pressure sensors 124 and 126 in accord with a method which is well-known to those skilled in the art. The fact that as shown in FIG. 7, the two lines 128 and 130 are not coincident obviously indicates that variations exist in the profile in the two parts being molded. Moreover, this difference between the two lines 128 and 130 probably stems from the fact that an imbalance exists between the hot runners 112 and 118, and/or that variations exist in the mold cavities 110 and 116. Consequently, by utilizing a graph such as that found illustrated in FIG. 7 of the drawings, i.e., by graphically plotting the profile of the parts being molded in multiple cavities of a single molding machine, it is possible to determine not only the profile of the individual parts being molded therein but also to effect a comparison therebetween. Based on such a comparison, it is further possible to determine whether the molding machine in which the components shown in FIG. 6 are embodied is producing parts which will not be subject to being rejected because of failure to possess the proper qualities, but also to determine if adjustments are required in the molding machine controls and to effect in response thereto the needed adjustments to correct for process changes, such as for instance adjustments in the hot runner settings.

Figure 8:
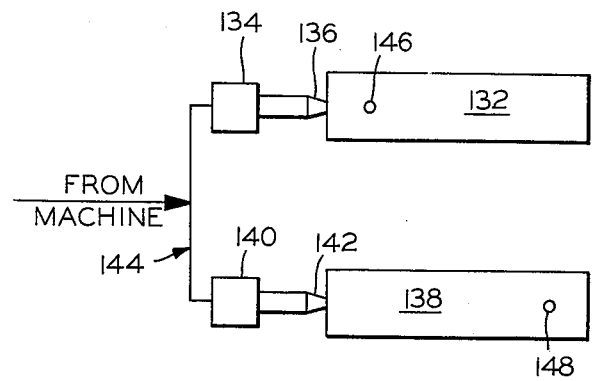
FIG. 8 is a schematic diagram of a portion of an injecting molding machine embodying multiple mold cavities, illustrating the positions occupied therein by the pressure sensing means for purposes of practicing the method of the present invention in accord with a fourth form thereof.
Figure 9:
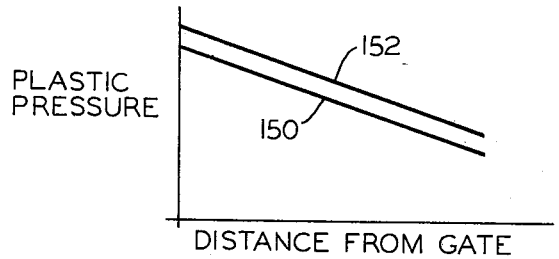
FIG. 9 is a graph of the profile of parts being molded in the mold cavities of FIG. 8 as determined by practicing the method of the present invention in accord with one form thereof.

Reference will now be had to FIGS. 8 and 9 of the drawings. FIG. 8 is similar to FIG. 6 of the drawings in that both of these figures contain a showing of a portion of an injection molding machine of the type which embodies multiple mold cavities. More specifically, there is illustrated in FIG. 8 of the drawings, a portion of an injection molding machine consisting of a first mold cavity 132 which has cooperatively associated therewith a hot runner 134, a gate 136 which functions to interconnect the first mold cavity 132 and the hot runner 134, a second mold cavity 138, a second hot runner 140 which is operatively associated with the second mold cavity 138, and a gate 142 which interconnects the hot runner 140 with the second mold cavity 138. In addition, as schematically shown in FIG. 8, the hot runners 134 and 140 are suitably connected in fluid flow relation by means of channel means 144 whereby material flowing within the molding machine is caused to flow simultaneously to the hot runners 134 and 140 and therefrom into the mold cavities 132 and 138, respectively. With respect to the showings which are found in FIGS. 8 and 6 of the drawings, the former differs from that of the latter which has been described previously hereinabove in that whereas in the latter pressure sensors are suitably mounted in the hot runners, in the former a pressure sensor 146 is mounted in the mold cavity 132 in juxtaposed relation to the gate 136 while a second pressure sensor 148 is mounted in the second mold cavity 138 at the end thereof remote from the gate 142. In a manner which will be described more fully in the succeeding paragraph, the pressure sensors 146 and 148 are employed for purposes of obtaining pressure sensings in the mold cavities 132 and 138. To this end, the pressure sensors 146 and 148 it is to be understood are supported in the mold cavities 132 and 138, respectively, so as to be located in the path of flow of the material being fed thereto.

With the pressure sensors 146 and 148 positioned in the manner described above, by plotting the values of the pressures obtained therefrom it is possible to produce the graph which is found depicted in FIG. 9 of the drawings. The graph shown in FIG. 9 is of the same type as that shown in FIG. 7, namely, a graph wherein the ordinate is in terms of pressure and the abscissa is a measure of distance, i.e., in this case a measure of the distance by which pressure sensors 146 and 148 are spaced from the gates 136 and 142. More specifically, by taking a sensing with the pressure sensor 146 and knowing the distance by which pressure sensor 146 is spaced from the gate 136, it is possible to establish a first point on the graph, i.e., a point wherein the pressure is equal to $P_1$. In addition, by extrapolating from this point, it is possible to produce the line identified in FIG. 9 by the reference numeral 150 which is a graphical repesentation of the profile of the part being molded in the mold cavity 132. In like manner, by taking a sensing with the pressure sensor 148 and knowing the distance by which this pressure sensor, i.e., sensor 148 is spaced from the gate 142, it is possible to establish another point on the graph, i.e., a point wherein the pressure is equal to $P_2$. Moreover, by extrapolating from the latter point it is possible to obtain the line identified in FIG. 9 by the reference numeral 152 which comprises a graphical representation of the profile of the part being molded in the mold cavity 138. Thus, by comparing the line 150 with the line 152, it is possible to obtain a comparison of the profile of the two parts being molded in the mold cavities 132 and 138 of the molding machine. In addition, it is possible to determine based on a graphical representation of the profile of the two parts as they appear for instance in FIG. 9 of the drawings, to determine whether or not process changes have occurred during the cycle of operation of the molding machine which would necessitate the rejection of one or the other of the two parts based on the failure thereof to embody the proper qualities. Also, in the event that it is found that from the profile of the two parts that the two parts need to be rejected, it is also possible to effect a determination as to the type of adjustmemt which would be necessitated in order in succeeding cycles to produce parts having the desired quality.

Figure 10:
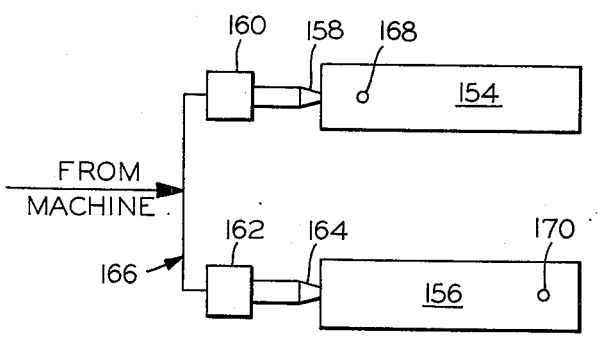
FIG. 10 is a schematic diagram of a portion of an injection molding machine illustrating the manner in which pressure sensing means may be located therein for purposes of determining by utilizing the method of the present invention in accord with one form thereof whether material flow at a given location or locations in the molding machine has occurred.

Turning next to a consideration of FIG. 10 of the drawings, there is depicted therein a schematic representation of a portion of an injection molding machine which is substantially similar to that found illustrated in FIG. 8. Thus, there is depicted in FIG. 10 a portion of an injection molding machine of the type which embodies multiple mold cavities. As will be described more fully hereinafter, it is however to be understood that the method which is now to be described as being practiced with the molding machine that embodies multiple mold cavities is also capable of being practiced in molding machines that embody a single mold cavity. Returning to the illustrated portion of the injection molding machine which is depicted in FIG. 10 of the drawings, the former includes a first and a second mold cavity 154 and 156, respectively. Cooperatively joined to the first mold cavity by means of the gate 158 is a first hot runner 160. In a similar manner, there is provided a second hot runner 162 which is joined to the second mold cavity 156 by means of the gate 164. The hot runners 160 and 162 in turn are connected in fluid flow relation together by means of channel means 166. The latter channel means 166 is operable to cause material to be supplied simultaneously to both hot runners 160 and 162, and therethrough to the mold cavities 154 and 156. Moreover, as shown in FIG. 10 of the drawings, the mold cavity 154 is preferably provided with a pressure sensor 168 and the mold cavity 156 with a pressure sensor 170. More specifically, the pressure sensor 168 is mounted in the mold cavity 154 so as to be positioned in the path of flow of the material which is supplied to the mold cavity 154 and so as to be located therein in relatively close proximity to the gate 158. The pressure sensor 170 on the other hand is mounted in the mold cavity 156 so as to be positioned in the path of flow of the material which is fed into the mold cavity 156 and so as to be located adjacent to the end of the mold cavity 156 which is opposite to the end thereof which is in communication with the gate 164. Furthermore, although not shown in the drawings and more particularly FIG. 10, in the interest of maintaining clarity of illustration, it is to be understood that the pressure sensors 168 and 170 are each operatively connected through suitable electrical circuit means to some form of indicator means whereby the pressures sensed by the pressure sensors 168 and 170 are capable of being displayed, in either a visual or some other form of indicating manner.

With reference now to the mode of operation of the components which are shown in FIG. 10 of the drawings, the method which is intended to be practiced thereby differs from that which has been described previously hereinabove. More specifically, wherein the components which have been shown in the other figures described above, have been utilized for purposes of establishing the viscosity of the material being fed into one or more mold cavities of an injection molding machine, and/or the profile of the pressure in the part being molded, the components depicted in FIG. 10 of the drawings are preferably utilized for purposes of determining whether or not there has been material flow into one or more mold cavities of the molding machine. To this end, the pressure sensor 168 is utilized for purposes of obtaining a pressure sensing in the mold cavity 154. Depending upon the result of the sensing which is obtained thereby, the pressure sensor 168 is operable to indicate by virtue of the level of the pressure sensed thereby whether material has been supplied at least to the location in the mold cavity 154 whereat the pressure sensor 168 is mounted. In response to a sensing that material has not reached the pressure sensor 168, the latter by means of suitable electrical circuit means can be utilized to provide an automatic indication that the part being molded in the mold cavity 154 should be rejected. Conversely, if from the pressure sensor 168 a pressure sensing is obtained from which it appears that material has at least been fed into the mold cavity 154 to the point whereat the pressure sensor 168 is located, this information can be utilized in accordance with the method which has been described previously hereinabove in connection with the description of the components shown in FIG. 8 of the drawings for purposes of establishing a profile of the part which is being molded in the mold cavity 154. Namely, this is determined by plotting on a graph such as that shown in FIG. 9 of the drawings, the point corresponding to the point which is shown in FIG. 9 of the drawings which is equivalent in pressure to $P_1$. Insofar as concerns the pressure sensor 170 which is mounted in the mold cavity 156, the latter is capable of being utilized in a manner substantially identical to that described above for the pressure sensor 168. More specifically, by taking a sensing in the mold cavity of the pressure which exists therein at the location whereat the pressure sensor 170 is mounted, it is possible to determine from the value of the pressure sensed whether or not material flow has occurred in the mold cavity 156. In addition, utilizing the value of the pressure obtained therewith, it is possible by extrapolating in the manner which has been described previously hereinabove a line corresponding to one or the other of the lines which appear on the graph shown in FIG. 9 of the drawings which corresponds to the profile of the part being molded in the mold cavity 156. In summary, it should be readily apparent from the above, that the pressure sensors 168 and 170 may be utilized for purposes of practicing the method in accord with the present invention wherein a determination is made as to whether or not material flow has occurred within either the mold cavity 154 or the mold cavity 156.

Hereinabove, there has now been described the structure which is also found depicted in the figures of the drawings through the operation of which the various forms of the method of the present invention are capable of being practiced. In accord with the present invention, a method is provided for determining the profile of a molded part as a means of checking the quality of a given molded part and/or as a basis for effecting adjustments in the molding machine controls. More specifically, a method is provided wherein a plurality of pressure sensings are taken simultaneously at different locations in the molding machine. Moreover, these pressure sensings can be utilized in different ways, namely, to solve for the viscosity of the material being fed into the molding machine from which parts are molded, to produce a graphical representation of the pressure profile in a molded part, or to provide a means operable to establish whether an actual flow of material has occurred at some particular location in the molding machine. More particularly, to solve for the viscosity of the material, the values for pressure which are obtained from sensings taken at suitable locations in the molding machine are substituted into a known mathematical formula along with a value for time $t$. For purposes of producing the aforementioned graphical representation of the profile in the molded part, the values for pressure obtained from the sensings are plotted against the distance corresponding to that which is measured between a preestablished reference point and the locations whereat the pressure sensings are taken. In this regard, the ordinate of the graph consists of the pressure in pounds per square inch, while the abscissa thereof consists of distance measured in suitable units of length. When utilized to determine whether material flow has occurred, the value of the pressure sensed is examined. It should be noted here again that the method of the present invention is capable of being practiced with molding machines which embody multiple mold cavities as well as molding machines which include only a single mold cavity. In practicing the method of the present invention with molding machines having single mold cavities, in accord with one form thereof, i.e., that depicted in FIGS. 2 and 3 of the drawings, the quality of a part being molded in the single mold cavity is checked by means of the informaion derived from taking simultaneous sensings in the hot runnr and in the mold cavity. Namely, a check can be made of the viscosity of the material through the use of a known mathematical formula, and a graphical representation of the profile in the molded part can also be produced from the pressure sensings. In accord with another form of the present invention, i.e., that found in FIGS. 4 and 5 of the drawings, the check of the quality of the part being molded in the molding machine is made by utilizing the information which is derived from the taking of simultaneous pressure sensings at spaced locations within the same mold cavity. When the method is practiced with molding machines embodying multiple mold cavities, in accord with one form thereof, i.e., that shown in FIGS. 6 and 7 of the drawings, a comparison check of the quality of a part being molded in one mold cavity with that being molded in a different mold cavity of the same molding machine is made from information derived by taking pressure sensings simultaneously in the corresponding hot runner for each mold cavity. In accord with another form of the method of the present invention, i.e., that shown in FIGS. 8 and 9 of the drawings, a comparison check is made of the quality of parts being molded in multiple cavities of the same molding machine from the information derived by obtaining pressure sensings simultaneously at locations which are spaced differently relative to the length of the respective mold cavity in each of the corresponding mold cavities. Finally, as has been set forth hereinabove in connection with the description of FIG. 10 of the drawings, a method has been provided which may be employed for purposes of determining whether material flow has occurred at a given location within a molding machine, both where the molding machine embodies multiplie mold cavities as depicted in FIG. 10 and where the molding machine embodies a single mold cavity.

Although several embodiments of systems which may be utilized for purposes of practicing the method of the present invention have been shown in the drawings and described hereinabove, it is to be understood that modifications may be made therein by those skilled in the art without departing from the essence of the invention. In this connection, some of the modifications which can be made therein have been alluded to hereinabove while others will become readily apparent to those skilled in the art when exposed to the present description and illustration of the systems which are depicted in FIGS. 2–10 of the drawings. For instance, although in describing the modes of operation of the systems schematically depicted in FIGS. 2–10 of the drawings, only two pressure sensings have been taken for purposes of establishing the line which graphically illustrates the profile of a part being molded, it is to be understood that more sensings could be taken for this purpose, if so desired, without departing from the essence of the invention. In addition, as noted above, based upon a comparison of the actual and the theoretical profiles of the part being molded and/or the actual and the theoretical viscosities thereof, adjutments as found to be required could be effected automatically in the molding machine controls, without departing from the essence of the present invention. On the other hand, likewise without departing from the essence of the invention and depending on the particular nature of the molding machine controls, the aforereferenced machine control adjustments could be effected nonautomatically. Also, the molding machine may be made to operate such that when parts are determined to lack the desired quality, suitable indicator means are actuated, either automatically or nonautomatically, to effect an identification of the part which is to be rejected. Moreover, in accord with the present invention, the adjustments which are found to be required in the controls of the molding machine in order to correct for process changes can be effected either so that they become operative in a succeeding cycle of operation of the molding machine 10, or if so desired, in the same cycle of operation thereof without departing from the essence of the present invention. Furthermore, it is to be understood that the pressure sensing means 28 as has been described above may take the form of pressure responsive switches which are operable to provide a digital output. In addition, however, the pressure sensing means 28 may also include pressure transducers, if so desired, the latter being operable to produce an analog output. Namely, if pressure transducers are utilized, then a continuous output will be produced therefrom, while if pressure responsive switches are utilized, then an output will be generated only when a given pressure switch is triggered upon the pressure being sensed thereby reaching the level or levels for which the contact or contacts thereof are set. In any event, irrespective of whether pressure transducers or pressure responsive switches are utilized in connection with the obtaining of the desired pressure sensings, the method of the present invention is practiced in substantially the same manner. Moreover, essentially any of the systems shown in FIGS. 2–10 of the drawings may be employed therewith with only minor adjustments being necessitated therein to render a given system operable upon receipt of a digital output from the pressure sensing means or operable upon the receipt of an analog output from the pressure sensing means.

Thus, it can be seen that the present invention provides a novel and improved method for determining the pressure profile of a molded part as a means of checking the quality of a given molded part. The method of the present invention is also operable for purposes of determining the pressure profile of a molded part as a means of establishing whether a need exists to effect adjustments in the molding machine controls. In addition, in accord with the present invention a method is provided for determining the pressure profile of a molded part being molded in a molding machine having a single mold cavity by simultaneously taking a pressure sensing in the hot runner of the molding machine and a pressure sensing at a location in the mold cavity. A method has been provided in accord with the present invention for determining the pressure profile of a molded part being molded in a molding machine having a single mold cavity by simultaneously obtaining pressure sensings from two locations suitably spaced apart in the mold cavity. Moreover, the method of the present invention is operable for purposes of determining the pressure profile of molded parts being molded in a molding machine having multiple mold cavities by comparing the profile of a part being molded in one cavity with that being molded in a different mold cavity of the same molding machine based on pressure sensings obtained simultaneously in the corresponding hot runner for each mold cavity. Furthermore, in accord with the present invention a method has been provided which is operable for determining the profile of molded parts being molded in a molding machine having multiple mold cavities by obtaining pressure sensings simultanously at differently spaced locations in each of the corresponding mold cavities. Finally, a method for determining the pressure profile of a molded part has also been provided in accord with the present invention which may be utilized for purposes of establishing whether any material flow has occurred at a given location either in a molding machine embodying a single mold cavity, or in a molding machine embodying multiple mold cavities.

Having this described the invention, We claim:

1. The method for effecting a check of the quality of a part being molded in a molding machine comprising the steps of:
   a. establishing a theoretical index effective to identify a part being molded during a cycle of operation of a molding machine as having the desired characteristics, said theoretical index being correlated for the particular material and mold being utilized in molding the part;
   b. obtaining a first sensing of the level of pressure of the material in the molding machine by means of a first pressure sensor mounted at a first location in the molding machine in the path of flow of the material therein;
   c. obtaining a second sensing simultaneous with the obtaining of said first sensing of the level of pressure of material in the molding machine by means of a second pressure sensor mounted at a second location in the molding machine in the path of flow of the material therein;
   d. establishing an actual index for a part being molded in a molding machine through use of the information derived from said first sensing and said second sensing; and
   e. checking the quality of the part being molded by comparing said actual index with said theoretical index so as to establish if said actual and theoretical indexes are the same within predetermined tolerances that the part is of the proper quality and if said actual and theoretical indexes differ by more than the predetermined tolerances that the part is of inadequate quality and should be rejected.

2. The method as set forth in claim 1 wherein said theoretical index and said actual index are each a measure of the viscosity of the material flowing between said first location whereat said first pressure sensor is positioned and said second location whereat said second pressure sensor is positioned.

3. The method as set forth in claim 1 wherein said theoretical index is a graphical representation of the theoretical pressure profile in a molded part comprising a line established by plotting as a first point thereon the theoretical level of the pressure that should be sensed by said first pressure sensor against the distance that said first pressure sensor is spaced from a predetermined reference point and as a second point thereon the theoretical level of the pressure that should be sensed by said second pressure sensor against the distance that said second pressure sensor is spaced from said predetermined reference point, and said actual index is a graphical representation of the actual pressure profile in the molded part comprising a line established by plotting as a first point thereon the actual level of the pressure sensed by said first pressure sensor against the distance that said first pressure sensor is spaced from said predetermined reference point and as a second point thereon the actual level of the pressure sensed by said second pressure sensor against the distance by which said second pressure sensor is spaced from said predetermined reference point.

4. The method as set forth in claim 1 wherein said first pressure sensor is mounted in the hot runner of the molding machine and said second pressure sensor is mounted in the mold cavity of the molding machine.

5. The method as set forth in claim 1 wherein said first pressure sensor and said second pressure sensor are both mounted in the mold cavity of the molding machine in spaced relation relative to each other and with said second pressure sensor being located downstream of said first pressure sensor in the path of flow of the material.

6. The method as set forth in claim 1 further comprising the step of establishing another actual index for a second part being molded in a second mold cavity of the same molding machine through the use of the information derived from said first sensing and said second sensing.

7. The method as set forth in claim 6 further comprising the step of checking the quality of the two parts being molded in different mold cavities of the same molding machine by comparing the actual index for each part relative to each other.

8. The method as set forth in claim 7 wherein said first pressure sensor is mounted in the hot runner cooperatively associated with one of the mold cavities in the molding machine and said second pressure sensor is mounted in the hot runner cooperatively associated with another one of the mold cavities in the same molding machine.

9. The method as set forth in claim 7 wherein said first pressure sensor is mounted in one of the mold cavities of the molding machine and said second pressure sensor is mounted in another one of the mold cavities of the same molding machine.

10. A method for determining the existence of material flow at a given location in the molding machine as a means of effecting a check of the quality of the part being molded therein comprising the steps of:
   a. establishing a theoretical value for the level of the pressure that should exist at the given location under normal material flow conditions;
   b. mounting a pressure sensor at the given location in the molding machine in the path of flow of the material;
   c. obtaining a sensing by means of the pressure sensor of the level of the pressure existing at the given location so as to establish an actual value for the pressure level thereat;
   d. comparing the theoretical value for the level of the pressure at the given location with the actual value for the level of the pressure thereat so as to establish if the theoretical and actual values are the same within predetermined tolerances that normal material flow conditions prevail and if the theoretical and actual values differ by more than the predetermined tolerances that abnormal material flow conditions prevail; and
   e. establishing an actual index for a part being molded in the molding machine through use of the information derived from said sensing if normal material flow conditions prevail and automatically indicating abnormal material flow conditions if such conditions prevail.

* * * * *